United States Patent
Beg et al.

(10) Patent No.: US 11,693,717 B2
(45) Date of Patent: *Jul. 4, 2023

(54) ALERT NOTIFICATION ON STREAMING TEXTUAL DATA

(71) Applicant: VMware, Inc., Palo Alto, CA (US)

(72) Inventors: Mirza Mohsin Beg, Foster City, CA (US); Venkat Gujjula, Leander, TX (US); Sai Samrat Karlapudi, Foster City, CA (US); Shefali Dubey, Santa Clara, CA (US); Anshu Bansal, Dublin, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,310

(22) Filed: Dec. 13, 2021

(65) Prior Publication Data

US 2022/0100589 A1 Mar. 31, 2022

Related U.S. Application Data

(63) Continuation of application No. 16/715,236, filed on Dec. 16, 2019, now Pat. No. 11,200,100.

(51) Int. Cl.
*G06F 9/54* (2006.01)
*G06F 16/17* (2019.01)
*G06F 9/48* (2006.01)

(52) U.S. Cl.
CPC .......... *G06F 9/542* (2013.01); *G06F 9/4837* (2013.01); *G06F 9/546* (2013.01); *G06F 16/1734* (2019.01)

(58) Field of Classification Search
CPC ........ G06F 9/542; G06F 9/546; G06F 9/4837; G06F 16/1734
See application file for complete search history.

(56) References Cited

U.S. PATENT DOCUMENTS

| | | |
|---|---|---|
| 2015/0134795 A1 | 5/2015 | Theimer et al. |
| 2016/0019258 A1 | 1/2016 | Clark et al. |
| 2016/0164761 A1 | 6/2016 | Sathyanarayana et al. |
| 2016/0285944 A1 | 9/2016 | Parikh et al. |
| 2016/0373302 A1 | 12/2016 | Sigoure |
| 2017/0169359 A1 | 6/2017 | Chernis et al. |
| 2017/0289240 A1 | 10/2017 | Ghare et al. |
| 2019/0081876 A1 | 3/2019 | Ghare et al. |
| 2019/0095510 A1 | 3/2019 | Cruise et al. |
| 2019/0243836 A1 | 8/2019 | Nanda et al. |
| 2019/0347351 A1* | 11/2019 | Koomthanam ....... G06F 16/178 |
| 2019/0347436 A1 | 11/2019 | Patton et al. |
| 2020/0076710 A1 | 3/2020 | Leon-Garcia et al. |

* cited by examiner

*Primary Examiner* — Charles E Anya (57) ABSTRACT

In a computer-implemented method for performing alert notification on streaming textual data, streaming textual data is received. A plurality of copies of the streaming textual data is generated, wherein a first copy of the streaming textual data is transmitted to an ingestion service for persistent storage at a data plane and a second copy of the streaming textual data is transmitted to an alert evaluation service for performing alert evaluation on the streaming textual data, such that the ingestion service and the alert evaluation service are performed independently. The streaming textual data is evaluated by the alert evaluation service to detect an alert. Responsive to detecting an alert at the alert evaluation service, a notification of the alert is generated.

14 Claims, 7 Drawing Sheets

ALERT NOTIFICATION ON STREAMING TEXTUAL DATA

RELATED APPLICATION

This application claims priority to and the benefit of U.S. patent application Ser. No. 16/715,236, now issued as U.S. Pat. No. 11,200,100, filed on Dec. 16, 2019, entitled "ALERT NOTIFICATION ON STREAMING TEXTUAL DATA," by Beg, et al., and assigned to the assignee of the present application, which is incorporated herein by reference in its entirety.

BACKGROUND

Management, monitoring, and troubleshooting in dynamic environments, both cloud-based and on-premises products, is increasingly important as the popularity of such products continues to grow. As the quantities of time-sensitive data grow, conventional techniques are increasingly deficient in the management of these applications. For instance, providing real-time, or near real-time, alerting on streaming textual data is increasingly difficult as the volume of such streaming textual data is increased. Many real time alerting systems have difficulty evaluating large quantities of streaming textual data and have limited scalability. Moreover, as evaluating these large quantities of data often have real-time requirements, the deficiencies of such conventional systems has become more pronounced.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "generating," "evaluating," "detecting," "comparing," "identifying," "determining," "storing," "satisfying," or the like, refer to the actions and processes of an electronic computing device or system such as: a host processor, a processor, a memory, a hyper-converged appliance, a software defined network (SDN) manager, a system manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Example embodiments described herein improve the performance (e.g., processing capacity and processing expediency) by performing alert evaluation on streaming textual data independently from ingestion of the streaming textual data into an ephemeral and/or persistent data store(s). In accordance with the described embodiments, streaming textual data is copied, where an ingestion service and an alert evaluation service each receive and operate on a separate copy of the streaming textual data. By duplicating the streaming textual data, and performing ingestion services and alert notification services separately, processing capacity can be more effectively load balanced such that the execution of one service does not negatively impact the performance of another service.

In some embodiments, streaming textual data is received. In one embodiment, the streaming textual data includes a plurality of data logs. A plurality of copies of the streaming textual data is generated, wherein a first copy of the streaming textual data is transmitted to an ingestion service or persistent storage at a data plane and a second copy of the streaming textual data is transmitted to an alert evaluation service for performing alert evaluation on the streaming textual data, such that the ingestion service and the alert evaluation service are performed independently. The streaming textual data is evaluated by the alert evaluation service to detect an alert.

In one embodiment, evaluation of the streaming textual data by the alert evaluation service to detect the alert includes comparing streaming textual data to alert conditions and detecting the alert in response to satisfying the alert conditions. In one embodiment, the alert conditions include a single instance alert condition for detecting the alert in response to identifying a single match between the streaming textual data and the single instance alert condition. In one embodiment, the alert conditions include a windowed alert condition for detecting the alert in response to identifying a predetermined number of matches between the streaming textual data and the windowed alert condition with a predetermined time window.

In one embodiment, comparing streaming textual data to windowed alert conditions includes storing an indication of the match at a persistent alert data store in response to identifying a match between the streaming textual data and the windowed alert condition. In one embodiment, the indication of the match includes a time stamp. It is determined whether the persistent alert data store includes at least the predetermined number of matches between the streaming textual data and the windowed alert condition within the predetermined time window. Provided the persistent alert data store includes at least the predetermined number of matches between the streaming textual data and the windowed alert condition within the predetermined time window, it is determined that the windowed alert condition is satisfied.

In one embodiment, determining whether the persistent alert data store includes at least the predetermined number of matches between the streaming textual data and the windowed alert condition within the predetermined time window is performed periodically for the predetermined time window. In one embodiment, the determining that the windowed alert condition is satisfied is performed upon determining that the predetermined number of matches within the predetermined time window is satisfied.

Responsive to detecting an alert at the alert evaluation service, a notification of the alert is generated. In one embodiment, a record of the notification is stored at the data plane in response to generating the notification of the alert.

Example System for Performing Alert Notification on Streaming Textual Data

Figure 1:
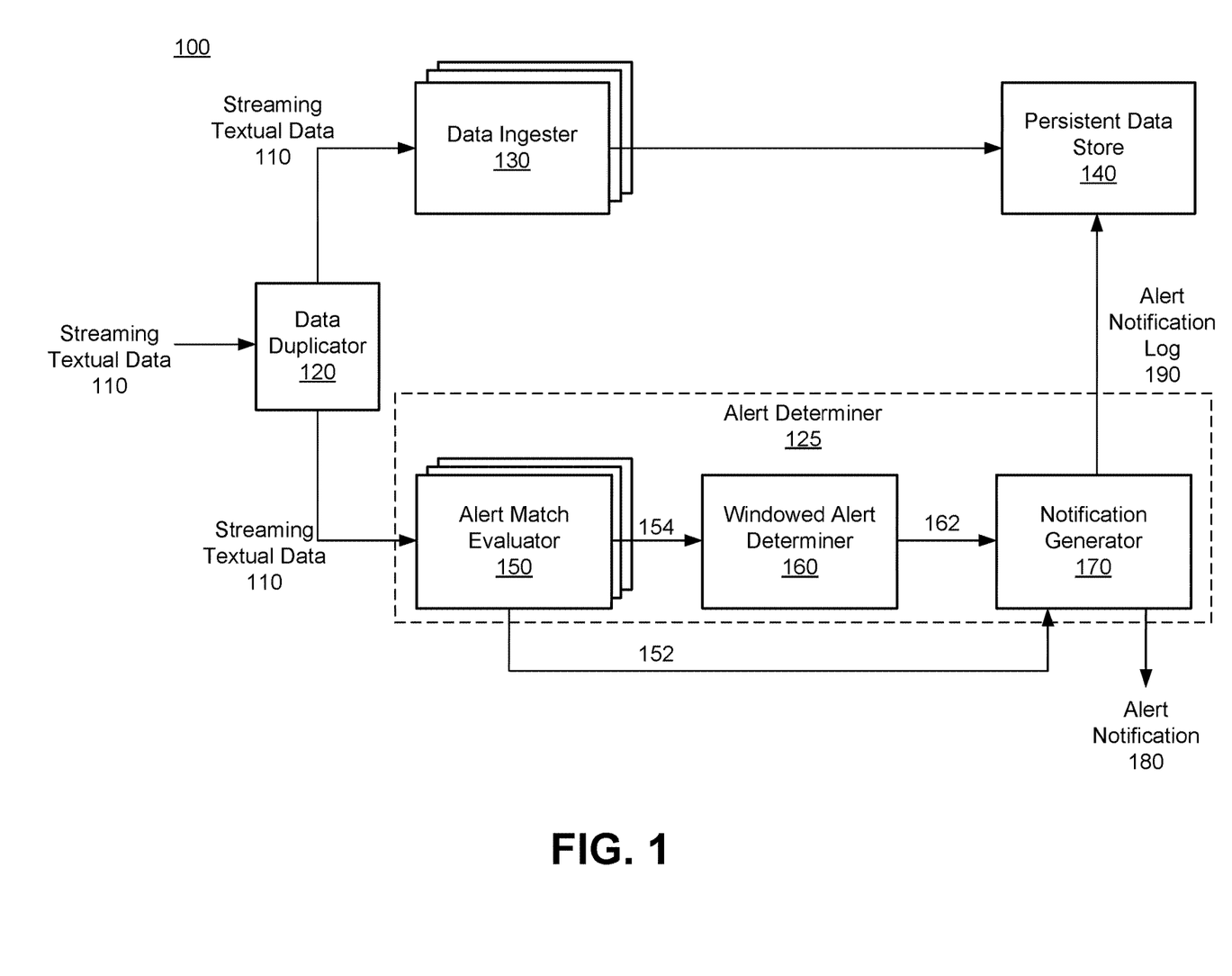
FIG. 1 is a block diagram illustrating an example system for performing alert notification on streaming textual data, in accordance with embodiments.

Example embodiments described herein provide systems and methods for performing alert notification on streaming textual data. In accordance with some embodiments, streaming textual data is received. A plurality of copies of the streaming textual data is generated, wherein a first copy of the streaming textual data is transmitted to an ingestion service (e.g. data ingester 130) for persistent storage at a data plane and a second copy of the streaming textual data is transmitted to an alert evaluation service (e.g., alert determiner 125) for performing alert evaluation on the streaming textual data, such that the ingestion service and the alert evaluation service are performed independently. The streaming textual data is evaluated by the alert evaluation service to detect an alert. Responsive to detecting an alert at the alert evaluation service, a notification of the alert is generated.

FIG. 1 is a block diagram illustrating an example system 100 for performing alert notification on streaming textual data 110, in accordance with embodiments. In some embodiments, system 100 is a distributed system including multiple services, including but not limited to ingestion services and alert evaluation services. It should be appreciated that system 100 can receive and perform operations on any type of streaming textual data, such as log data, alphanumeric data, alphabetical data, numerical data, or any other type of textual data. Embodiments described herein can pertain to any type of high volume textual data, e.g., data in the enterprise data space, for which real-time or near real-time alert processing is useful.

Streaming textual data 110 is received at data duplicator 120 of system 100. Data duplicator 120 is configured to duplicate streaming textual data 110 (e.g., copy) into any number of identical output streams. For example, data duplicator 120 can duplicate streaming textual data 110 into two identical streams each processing data at its own independent rate. It should be appreciated that data duplicator 120 can duplicate streaming textual data 110 as needed to provide for the services provided by system 100. Data duplicator 120 forwards each copy of streaming textual data 110 to the prescribed services. It should further be appreciated that data duplicator 120 can perform other functions, e.g., load balancing, which are not described herein.

As illustrated in FIG. 1, data duplicator 120 transmits one or more copies of streaming textual data 110 to data ingester 130 and one or more copies of streaming textual data 110 to alert match evaluator 150. It should be appreciated that system 100 may include one or more instances of data ingester 130 and match evaluator 150, as system 100 support scalability depending on demand and/or design. The number of instances of data ingester 130 and alert match evaluator 150 can vary depending on operational conditions. In some embodiments, data duplicator 120 allows for non-linear scalability, and can provide as many duplicates of streaming textual data 110 as needed to transmit to one or more instances of data ingester 130 and match evaluator 150.

Data ingester 130 is configured to process received streaming textual data 110 for persistence at persistent data store 140, wherein persistent data store 140 is located in the data plane of system 100. It should be appreciated that each instance of data ingester 130 receives a copy of streaming textual data 110 from data duplicator 120. In accordance with various embodiments, data ingester 130 is configured to transform, enhance, tag, obfuscate, and/or filter streaming textual data 110 to prepare streaming textual data 110 for storage at persistent data store 140. For example, data ingester 130 may apply tags to streaming textual data 110 for later querying. In general, data ingester 130 prepares streaming textual data 110 for storage at persistent data store 140 in accordance with appropriate storage parameters. It should be appreciated that data ingester 130 operates independently of, and concurrently with, alert match evaluator 150. Data ingester 130 forwards streaming textual data 110 (modified as prescribed by data ingester 130) to persistent data store 140 for persistent storage.

System 100 also includes alert match evaluator 150, windowed alert determiner 160, and notification generator 170, collectively referred to herein as alert determiner 125. Alert determiner 125 receives streaming textual data 110 for performing alert evaluation operations of streaming textual data 110. It should be appreciated that each instance of alert match evaluator 150 receives a copy streaming textual data 110 from data duplicator 120. Alert determiner 125 is operable to perform alert evaluation on streaming textual data 110 independent of, and concurrently with, the operation of data ingester 130. Alert determiner 125 evaluates streaming textual data 110 as it is received for identifying defined alert conditions.

It should be appreciated that alert determiner 125 can perform various types of alert evaluation. In one embodiment, alert determiner 125 performs single instance alert determination, such that upon identifying satisfaction of a single instance of an alert condition, an alert notification is generated. For example, single instance alerts may include faults, exceptions, condition satisfaction, etc., such that once the alert condition is satisfied, a notification is generated. As single instance alerts are immediately identified upon satisfaction of one alert condition, single instance alerts are also referred to as per event real time alerts.

In another embodiment, alert determiner 125 performs windowed alert determination, such that upon identifying a number of events within a time window (e.g., four events within a five minute time window), an alert condition is satisfied and an alert notification is generated. In some embodiments, windowed alert determination is performed periodically for a preceding time window (e.g., at 5 pm, the preceding 24 hours is evaluated to determine satisfaction of the alert condition). In other embodiments, windowed alert determination is performed such that upon identifying the number of events within a time period less than the time window, an alert notification is generated, regardless of whether the time window has lapsed (e.g., events are constantly polled and upon identification of the number of events, immediate satisfaction of the alert conditions is identified without waiting until the end of the time window. These instance alerts are identified upon satisfaction of their windowed alert condition, and are referred to as windowed real time alerts.

In accordance with various embodiments, alert determiner 125 is operable to analyze the instances of streaming textual data 110 for matching patterns. It should be appreciated that these patterns can be in any form, from simple key word matches, to sophisticated expressions including Boolean operators, wildcards, propositional logic, etc. As it is received, each instance of streaming textual data 110 is evaluated for alerts by determining if there is a match to a defined alert condition. Matches are performed for both single instance alerts and windowed alerts. Alert determiner 125 accepts multiple expressions that are individually evaluated and then joined by logical operators. In some embodiments, alert determiner 125 evaluates each expression according to a Boolean value. The expressions are evaluated for each incoming instance of streaming textual data and every match is recorded.

Figure 2:
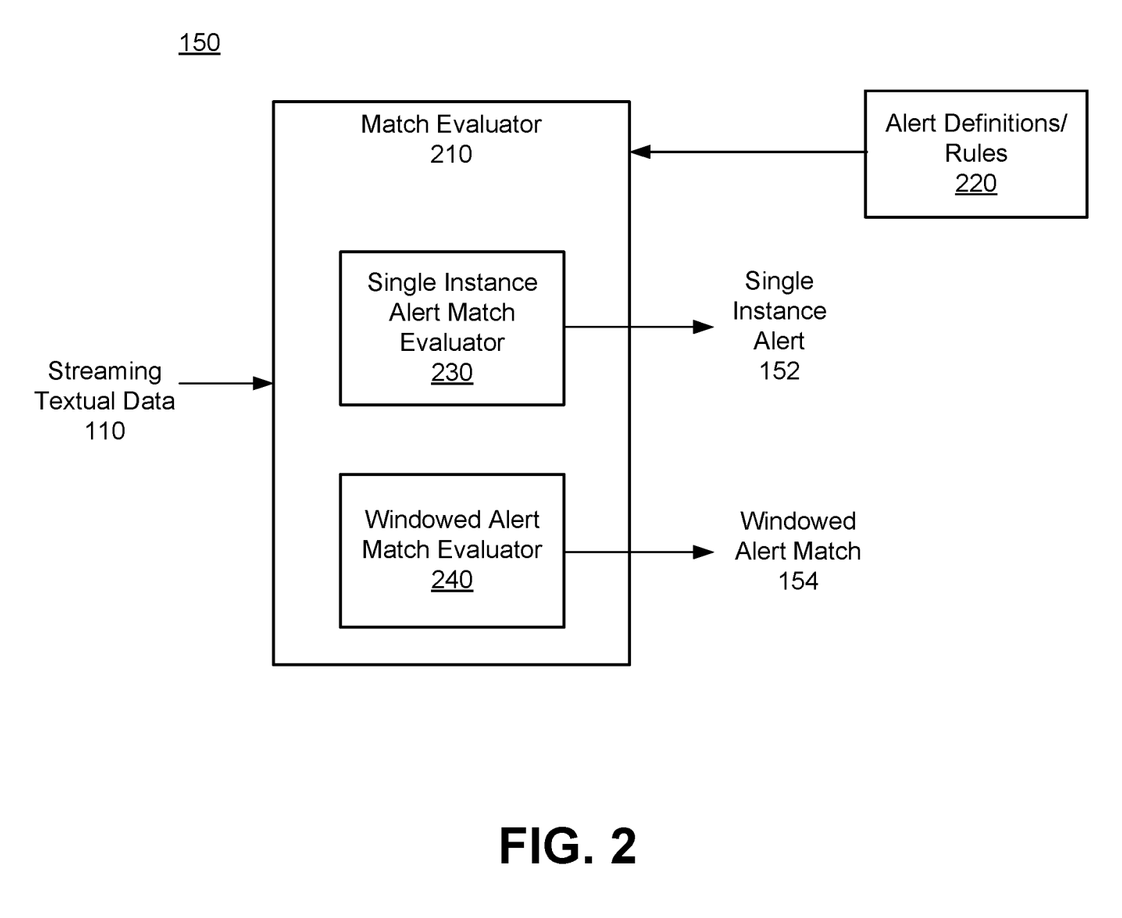
FIG. 2 is a block diagram illustrating an example alert match evaluator, in accordance with embodiments.

FIG. 2 is a block diagram illustrating an example alert match evaluator 150, in accordance with embodiments. It should be appreciated that a single instance of alert match evaluator 150 is shown in FIG. 2, and that where system 100 includes multiple instances of alert match evaluator 150, each alert match evaluator may operate in the same manner. Streaming textual data 110 is received at match evaluator 210 of alert match evaluator 150.

In one embodiment, match evaluator 210 includes at least one of single instance alert match evaluator 230 and windowed alert match evaluator 240. In one embodiment, match evaluator 210 includes both single instance alert match evaluator 230 and windowed alert match evaluator 240. In other embodiments, match evaluator 210 includes other types of match evaluators for performing other types of alert notifications. Alert definitions/rules 220 defines the alert conditions by which single instance alert match evaluator 230 and windowed alert match evaluator 240 perform alert matching. In some embodiments, match evaluator 210 individually evaluates received expressions and then joins the expressions by logical operators. In some embodiments, match evaluator 210 (e.g., at single instance alert match evaluator 230 and windowed alert match evaluator 240) evaluates each expression according to a Boolean value. The expressions are evaluated for each incoming instance of streaming textual data and every match is recorded.

Single instance alert match evaluator 230 analyzes each instance of streaming textual data for a matching pattern (e.g., keyword match or wildcards), as defined by alert definitions/rules 220. In response to identifying a matching pattern, a match is detected and single instance alert 152 is generated. Single instance alert 152 is communicated to notification generator 170 of FIG. 1.

Windowed alert match evaluator 240 also analyzes each instance of streaming textual data for a matching pattern (e.g., keyword match or wildcards), as defined by alert definitions/rules 220. In response to identifying a matching pattern, a match is detected and windowed alert match 154 is generated. Windowed alert match 154 is communicated to windowed alert determiner 160 of FIGS. 1 and 3.

Figure 3:
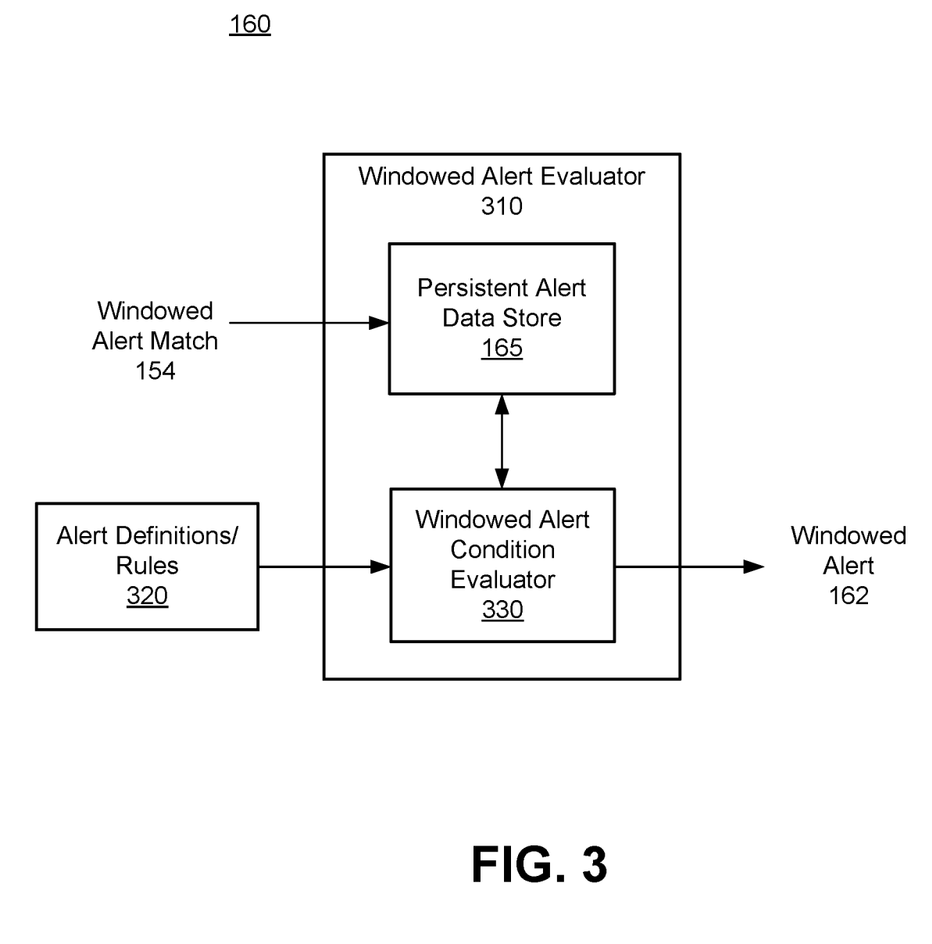
FIG. 3 is a black diagram illustrating an example windowed alert determiner, in accordance with embodiments.

FIG. 3 is a black diagram illustrating an example windowed alert determiner 160, in accordance with embodiments. Windowed alert determiner 160 includes windowed alert evaluator 310 for determining whether an alert condition for a windowed alert is satisfied. Windowed alert determiner 160 receives each instance of windowed alert match 154 for storage in persistent alert data store 165 of windowed alert evaluator 310.

Windowed alert condition evaluator 330 analyzes persistent alert data store 165 for windowed alert matches 154 that satisfy the windowed alert conditions defined by alert definitions/rules 320. It should be appreciated that alert definitions/rules 320 can be alert definitions/rules 220 of FIG. 2, or can be a separate instance of alert definitions/rules. Windowed alert condition evaluator 330 determines whether persistent alert data store 165 includes at least the predetermined number of windowed alert matches 154 as defined by each windowed alert condition of alert definitions/rules 320. Responsive to determining that persistent alert data store 165 includes at least the predetermined number of windowed alert matches 154, it is determined that the windowed alert condition is satisfied, and windowed alert 162 is generated. Windowed alert 162 is communicated to notification generator 170 of FIG. 1.

In some embodiments, a count of each instance of windowed alert match 154 is maintained in persistent alert data store 165. In some embodiments, each instance of windowed alert match 154 has an associated time stamp for determining a time-to-live, as defined by the alert definitions/rules. If the count as defined by a windowed alert condition is satisfied, windowed alert 162 is generated. Each windowed alert match 154 is subject to expiration as defined by the alert conditions. In some embodiments, upon expiration, a windowed alert match 154 is deleted from persistent alert data store 165. In other embodiments, expiration of a windowed alert match 154 is defined by an alert condition, and the windowed alert match 154 is not considered where it is outside of the time window defined by an alert condition.

It should be appreciated that, in accordance with some embodiments, windowed alert condition evaluator 330 is executed periodically for a preceding time window (e.g., at 5 pm, the preceding 24 hours is evaluated to determine satisfaction of the alert condition). In other embodiments, windowed alert condition evaluator 330 is executed such that upon identifying the number of events within a time period less than the time window, an alert notification is generated, regardless of whether the time window has lapsed (e.g., events are constantly polled and upon identification of the number of events, immediate satisfaction of the alert conditions is identified without waiting until the end of the time window.

With reference to FIG. 1, notification generator 170 is configured to receive single instance alerts 152 and windowed alerts 162. Upon receipt of a single instance alert 152 or a windowed alert 162, notification generator 170 is configured to generate and transmit alert notification 180. Alert notification 180 includes, but is not limited to, part of complete data identifying satisfaction of the alert condition and reference to the alert definition that triggered it, and is communicated as defined by the alert definitions/rules. It should be appreciated that alert notification 180 can be communicated in different ways, including without limitation: email, text message, social messaging platform, etc. Alert notification 180 may also include any necessary attachments (e.g., pdf files, documents, reports, etc.), hyperlinks, etc.

In some embodiments, in response to generating an alert notification 180, an alert notification log 190 is generated and communicated to persistent data store 140 for storage. For example, alert notification logs 190 can be used for supporting an audit of alert notifications 180, to confirm whether an appropriate alert notification 180 was generated in response to satisfaction of an alert condition.

Figure 4:
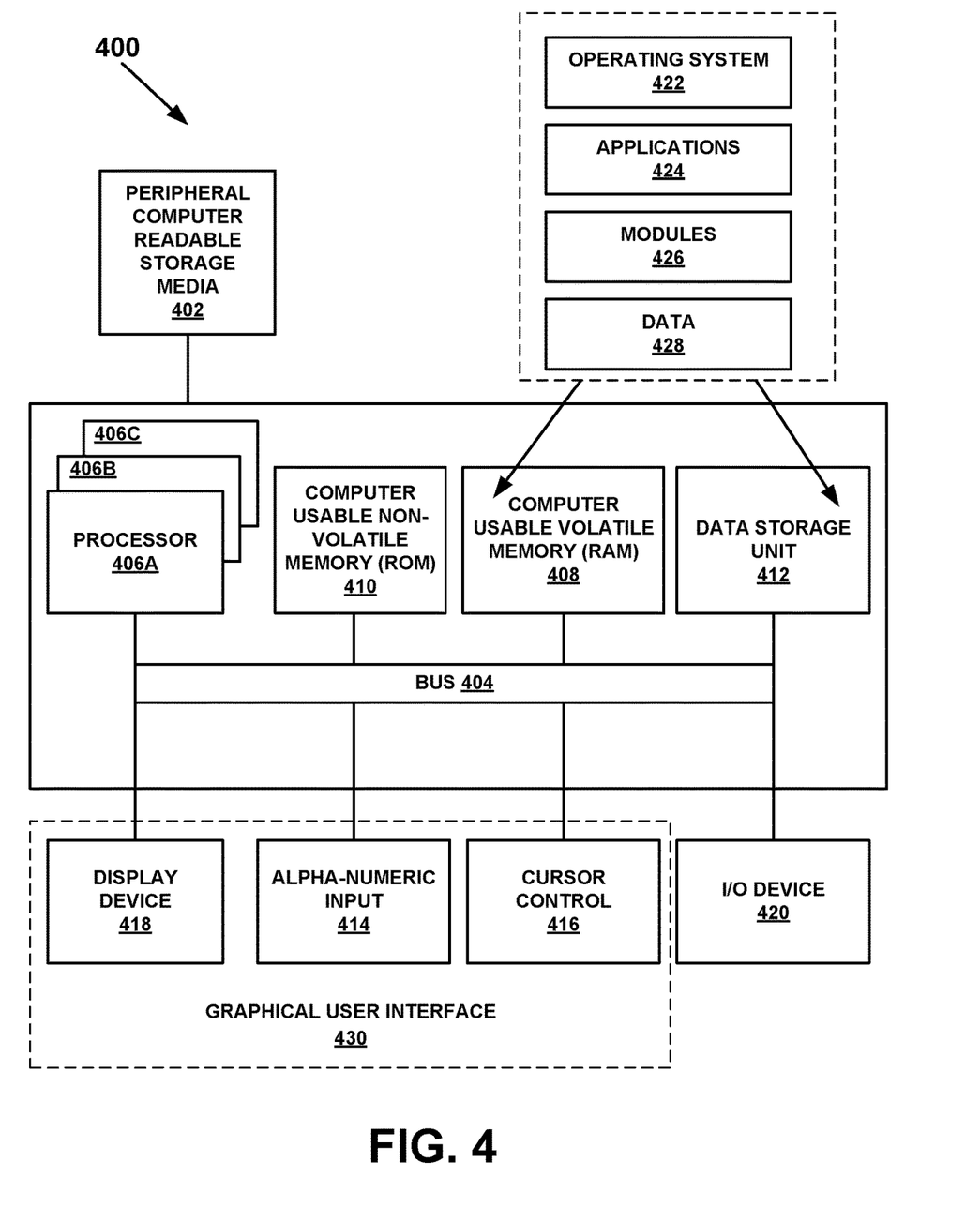
FIG. 4 is a block diagram illustrating an example computer system upon which embodiments of the present invention can be implemented.

FIG. 4 is a block diagram of an example computer system 400 upon which embodiments of the present invention can be implemented. FIG. 4 illustrates one example of a type of computer system 400 (e.g., a computer system) that can be used in accordance with or to implement various embodiments which are discussed herein.

It is appreciated that computer system 400 of FIG. 4 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, standalone computer systems, media centers, handheld computer systems, multi-media devices, and the like. In some embodiments, computer system 400 of FIG. 4 is well adapted to having peripheral tangible computer-readable storage media 402 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 400 of FIG. 4 includes an address/data bus 404 for communicating information, and a processor 406A coupled with bus 404 for processing information and instructions. As depicted in FIG. 4, computer system 400 is also well suited to a multi-processor environment in which a plurality of processors 406A, 406B, and 406C are present. Conversely, computer system 400 is also well suited to having a single processor such as, for example, processor 406A. Processors 406A, 406B, and 406C may be any of various types of microprocessors. Computer system 400 also includes data storage features such as a computer usable volatile memory 408, e.g., random access memory (RAM), coupled with bus 404 for storing information and instructions for processors 406A, 406B, and 406C. Computer system 400 also includes computer usable non-volatile memory 410, e.g., read only memory (ROM), coupled with bus 404 for storing static information and instructions for processors 406A, 406B, and 406C. Also present in computer system 400 is a data storage unit 412 (e.g., a magnetic or optical disc and disc drive) coupled with bus 404 for storing information and instructions. Computer system 400 also includes an alphanumeric input device 414 including alphanumeric and function keys coupled with bus 404 for communicating information and command selections to processor 406A or processors 406A, 406B, and 406C. Computer system 400 also includes a cursor control device 416 coupled with bus 404 for communicating user input information and command selections to processor 406A or processors 406A, 406B, and 406C. In one embodiment, computer system 400 also includes a display device 418 coupled with bus 404 for displaying information.

Referring still to FIG. 4, display device 418 of FIG. 4 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 416 allows the computer user to dynamically signal the movement of a visible symbol (cursor) on a display screen of display device 418 and indicate user selections of selectable items displayed on display device 418. Many implementations of cursor control device 416 are known in the art including a trackball, mouse, touch pad, touch screen, joystick or special keys on alphanumeric input device 414 capable of signaling movement of a given direction or manner of displacement. Alternatively, it will be appreciated that a cursor can be directed and/or activated via input from alphanumeric input device 414 using special keys and key sequence commands. Computer system 400 is also well suited to having a cursor directed by other means such as, for example, voice commands. In various embodiments, alphanumeric input device 414, cursor control device 416, and display device 418, or any combination thereof (e.g., user interface selection devices), may collectively operate to provide a graphical user interface (GUI) 430 under the direction of a processor (e.g., processor 406A or processors 406A, 406B, and 406C). GUI 430 allows user to interact with computer system 400 through graphical representations presented on display device 418 by interacting with alphanumeric input device 414 and/or cursor control device 416.

Computer system 400 also includes an I/O device 420 for coupling computer system 400 with external entities. For example, in one embodiment, I/O device 420 is a modem for enabling wired or wireless communications between computer system 400 and an external network such as, but not limited to, the Internet. In one embodiment, I/O device 420 includes a transmitter. Computer system 400 may communicate with a network by transmitting data via I/O device 420.

Referring still to FIG. 4, various other components are depicted for computer system 400. Specifically, when present, an operating system 422, applications 424, modules 426, and data 428 are shown as typically residing in one or some combination of computer usable volatile memory 408 (e.g., RAM), computer usable non-volatile memory 410 (e.g., ROM), and data storage unit 412. In some embodiments, all or portions of various embodiments described herein are stored, for example, as an application 424 and/or module 426 in memory locations within RAM 408, computer-readable storage media within data storage unit 412, peripheral computer-readable storage media 402, and/or other tangible computer-readable storage media.

Example Methods of Operation

Figure 5:
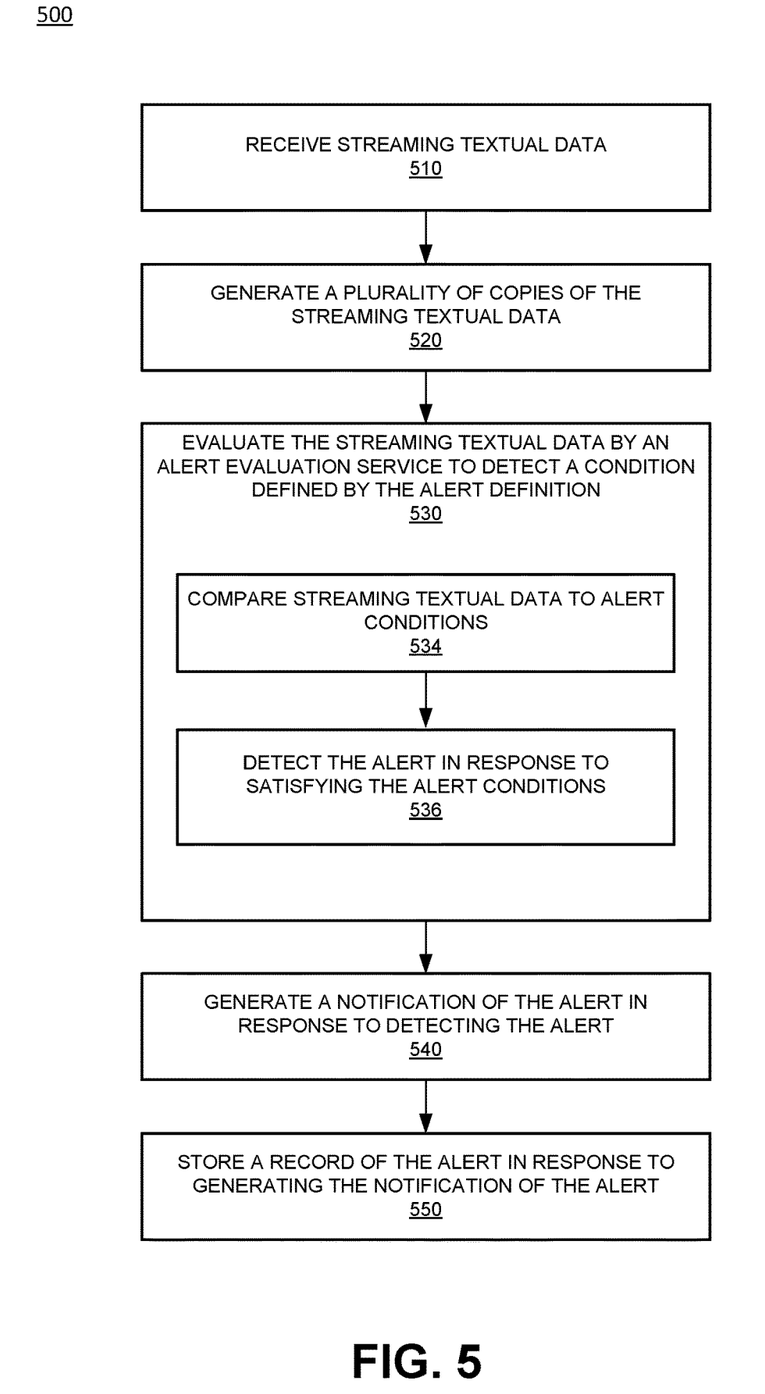
FIG. 5 is a flow diagram illustrating an example method for performing alert notification on streaming textual data, in accordance with embodiments.
Figure 6:
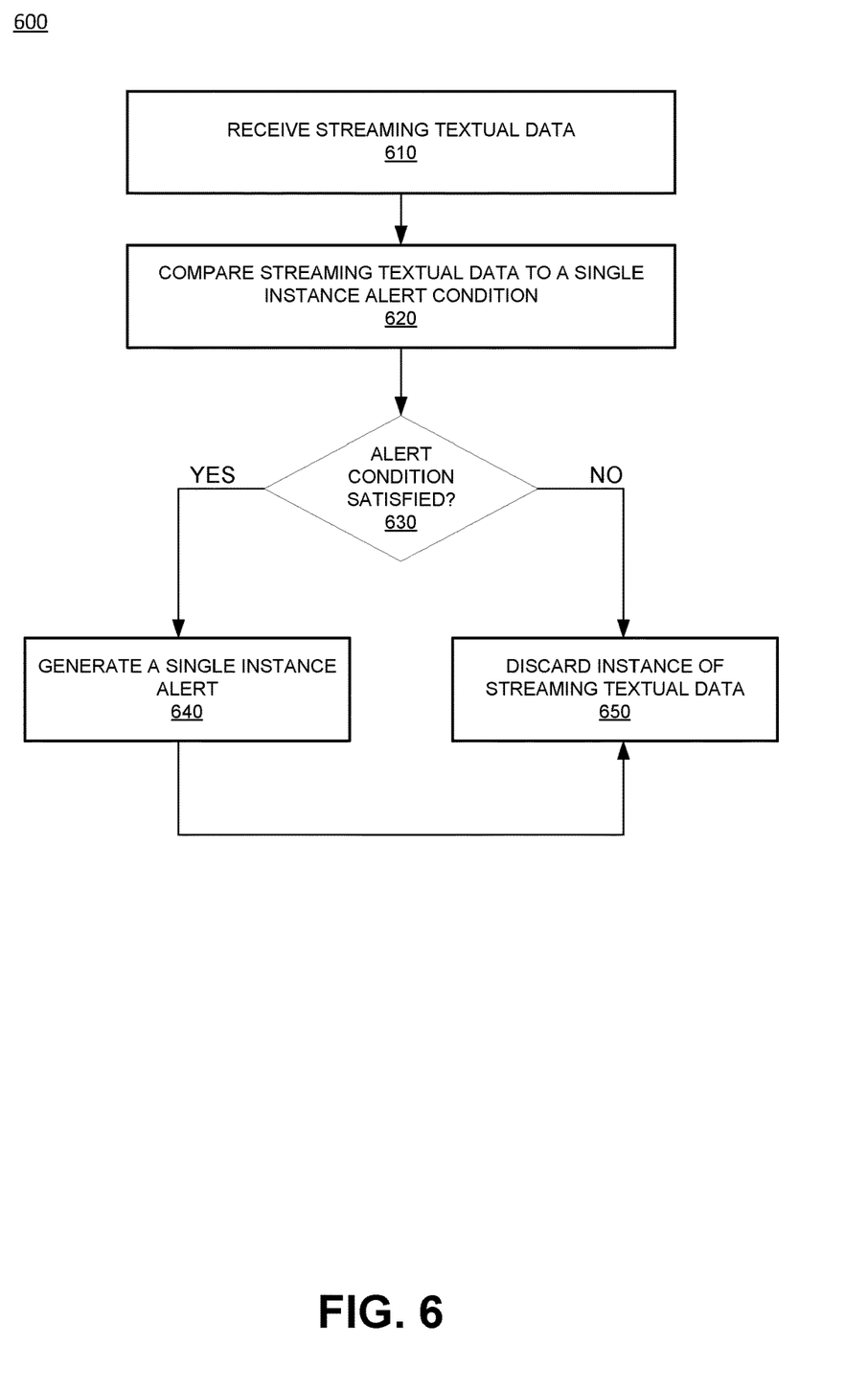
FIG. 6 is a flow diagram illustrating an example method for performing single instance alert match evaluation, in accordance with embodiments.
Figure 7:
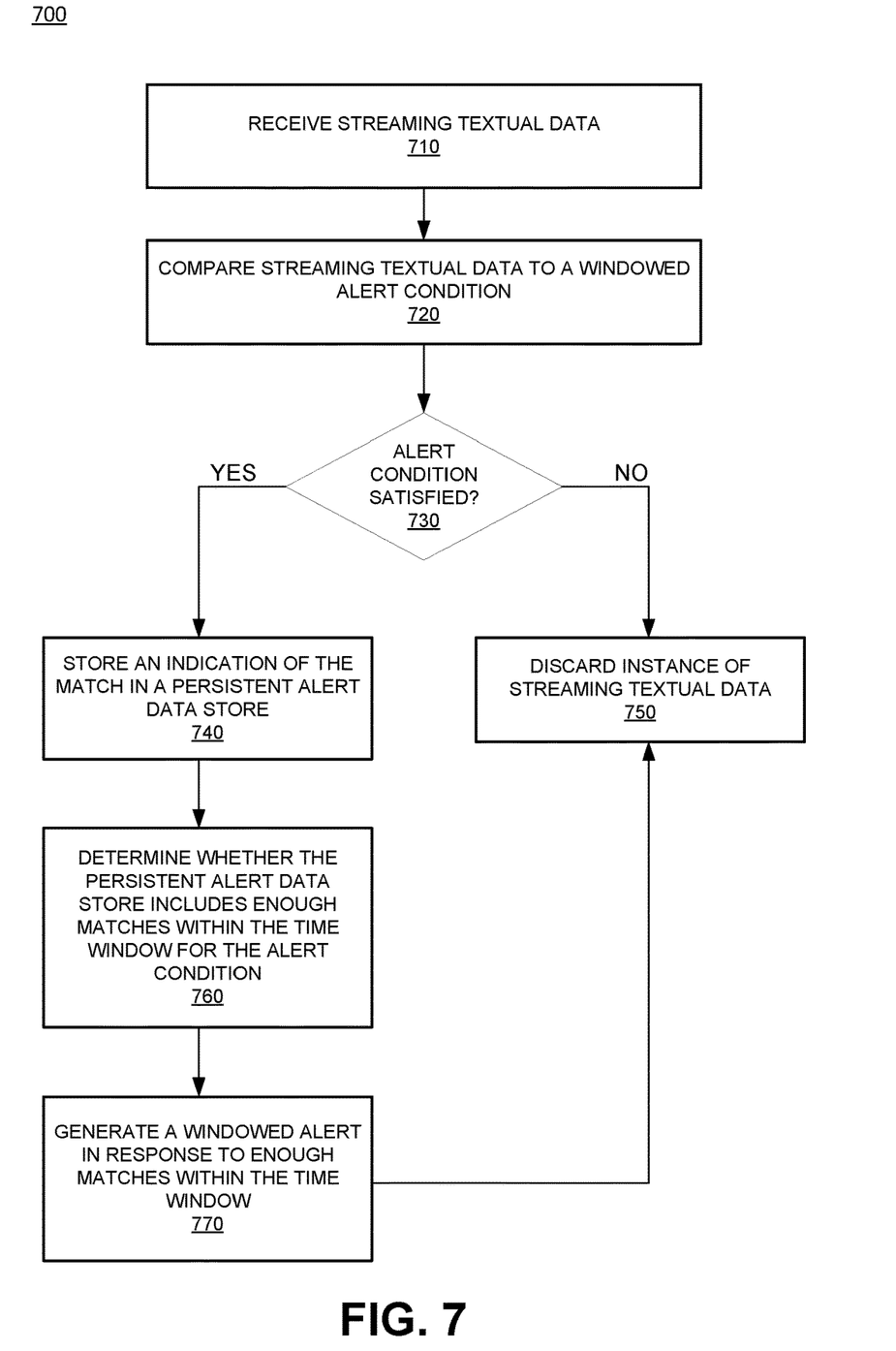
FIG. 7 is a flow diagram illustrating an example method for performing windowed alert match evaluation, in accordance with embodiments.

The following discussion sets forth in detail the operation of some example methods of operation of embodiments. With reference to FIGS. 5, 6, and 7, flow diagrams 500, 600, and 700 illustrate example procedures used by various embodiments. The flow diagrams include some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 400). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram, such procedures are examples. That is, embodiments are well suited to performing various other procedures or variations of the procedures recited in the flow diagram. Likewise, in some embodiments, the procedures in the flow diagrams may be performed in an order different than presented and/or not all of the procedures described in the flow diagrams may be performed. It is further appreciated that procedures described in the flow diagrams may be implemented in hardware, or a combination of hardware with firmware and/or software provided by computer system 400.

FIG. 5 is a flow diagram 500 illustrating an example method for performing alert notification on streaming textual data, in accordance with embodiments. At procedure 510 of flow diagram 500, streaming textual data is received. At procedure 520, a plurality of copies of the streaming textual data is generated, wherein a first copy of the streaming textual data is transmitted to an ingestion service for persistent storage at a data plane and a second copy of the streaming textual data is transmitted to an alert evaluation service for performing alert evaluation on the streaming textual data, such that the ingestion service and the alert evaluation service are performed independently.

At procedure 530, the streaming textual data is evaluated by the alert evaluation service to detect an alert condition. In one embodiment, as shown at procedure 534, streaming textual data is compared to alert conditions. In one embodiment, the alert conditions include a single instance alert condition for detecting the alert in response to identifying a single match between the streaming textual data and the single instance alert condition. In one embodiment, the alert conditions include a windowed alert condition for detecting the alert in response to identifying a predetermined number of matches between the streaming textual data and the windowed alert condition with a predetermined time window.

In one embodiment, procedure 534 is performed according to flow diagram 600 of FIG. 6. FIG. 6 is a flow diagram 600 illustrating an example method for performing single instance alert match evaluation, in accordance with embodiments. At procedure 610 of flow diagram 600, streaming textual data is received. At procedure 620, instances of the streaming textual data are compared to a single instance alert condition. At procedure 630, it is determined whether the single instance alert condition is satisfied. At procedure 640, provided the single instance alert condition is satisfied, a single instance alert notification is generated. At procedure 650, provided the single instance alert condition is not satisfied for the instance of streaming textual data, the instance of streaming textual data is discarded.

In one embodiment, procedure 534 is performed according to flow diagram 700 of FIG. 7. FIG. 7 is a flow diagram 700 illustrating an example method for performing windowed alert match evaluation, in accordance with embodiments. At procedure 710 of flow diagram 700, streaming textual data is received. At procedure 720, instances of the streaming textual data are compared to a windowed alert condition. At procedure 730, it is determined whether the windowed alert condition is satisfied.

At procedure 740, provided the single instance alert condition is satisfied (e.g., the is a match between the streaming textual data and the windowed alert condition), an indication of the match is stored in a persistent alert data store. In one embodiment, the indication of the match includes a time stamp. At procedure 760, it is determined whether the persistent alert data store includes at least the predetermined number of matches between the streaming textual data and the windowed alert condition within the predetermined time window. In some embodiments, procedure 760 is performed periodically for the predetermined time window. At procedure 770, in response to determining that the persistent alert data store includes at least a predetermined number of matches between the streaming textual data and the windowed alert condition within the predetermined time window, it is determined that the windowed alert condition is satisfied, and a windowed alert is generated. In some embodiment, procedure 770 is performed upon determining that the predetermined number of matches within the predetermined time window is satisfied.

At procedure 750, provided the windowed alert condition is not satisfied for the instance of streaming textual data, the instance of streaming textual data is discarded.

With reference again to FIG. 5, in accordance with an embodiment, at procedure 536, an alert is detected in response to satisfying the alert conditions.

At procedure 540, a notification of the alert is generated in response to detecting an alert at the alert evaluation service. In one embodiment, as shown at procedure 550, a record of the notification is stored in response to generating the notification of the alert.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for performing alert notification on streaming textual data, the method comprising:
receiving streaming textual data;
generating a plurality of copies of the streaming textual data;
transmitting a first copy of the streaming textual data to an ingestion service for persistent storage at a data plane;
transmitting a second copy of the streaming textual data to an alert evaluation service for performing alert evaluation on the streaming textual data, wherein the ingestion service is performed on the first copy of the streaming textual data and the alert evaluation service is performed on the second copy of the streaming textual data independently and concurrently;
storing the first copy of the streaming textual data at a persistent data store of the data plane;
evaluating the second copy of the streaming textual data by the alert evaluation service to detect an alert, wherein the evaluating the streaming textual data by the alert evaluation service to detect the alert comprises:
comparing streaming textual data to alert conditions; and
responsive to satisfying the alert conditions, detecting the alert;
wherein the alert conditions comprise a single instance alert condition for detecting the alert in response to identifying a single match between the streaming textual data and the single instance alert condition and, a windowed alert condition for detecting the alert in response to identifying a predetermined number of matches between the streaming textual data and the windowed alert condition with a predetermined time window; and responsive to detecting an alert at the alert evaluation service, generating a notification of the alert.

2. The method of claim 1, wherein the comparing streaming textual data to alert conditions comprises:

responsive to identifying a match between the streaming textual data and the windowed alert condition, storing an indication of the match at a persistent alert data store;

determining whether the persistent alert data store comprises at least the predetermined number of matches between the streaming textual data and the windowed alert condition within the predetermined time window; and provided the persistent alert data store comprises at least the predetermined number of matches between the streaming textual data and the windowed alert condition within the predetermined time window, determining that the windowed alert condition is satisfied.

3. The method of claim 2, wherein the determining whether the persistent alert data store comprises at least the predetermined number of matches between the streaming textual data and the windowed alert condition within the predetermined time window is performed periodically for the predetermined time window.

4. The method of claim 2, wherein the determining that the windowed alert condition is satisfied is performed upon determining that the predetermined number of matches within the predetermined time window is satisfied.

5. The method of claim 2, wherein the indication of the match comprises a time stamp.

6. The method of claim 1, further comprising:

responsive to generating the notification of the alert, storing a record of the notification at the persistent data store.

7. The method of claim 1, wherein the streaming textual data comprises a plurality of data logs.

8. A non-transitory computer readable storage medium having computer readable program code stored thereon for causing a computer system to perform a method for performing alert notification on streaming textual data, the method comprising:

receiving streaming textual data; generating a plurality of copies of the streaming textual data;

transmitting a first copy of the streaming textual data to an ingestion service for persistent storage at a data plane;

transmitting a second copy of the streaming textual data to an alert evaluation service for performing alert evaluation on the streaming textual data, wherein the ingestion service is performed on the first copy of the streaming textual data and the alert evaluation service is performed on the second copy of the streaming textual data independently and concurrently;

storing the first copy of the streaming textual data at a persistent data store of the data plane;

evaluating the second copy of the streaming textual data by the alert evaluation service to detect an alert, wherein the evaluating the streaming textual data by the alert evaluation service to detect the alert comprises: comparing streaming textual data to alert conditions; and responsive to satisfying the alert conditions, detecting the alert;

wherein the alert conditions comprise a single instance alert condition for detecting the alert in response to identifying a single match between the streaming textual data and the single instance alert condition and, a windowed alert condition for detecting the alert in response to identifying a predetermined number of matches between the streaming textual data and the windowed alert condition with a predetermined time window; and responsive to detecting an alert at the alert evaluation service, generating a notification of the alert.

9. The non-transitory computer readable storage medium of claim 8, wherein the comparing streaming textual data to alert conditions comprises:

responsive to identifying a match between the streaming textual data and the windowed alert condition, storing an indication of the match at a persistent alert data store;

determining whether the persistent alert data store comprises at least the predetermined number of matches between the streaming textual data and the windowed alert condition within the predetermined time window; and provided the persistent alert data store comprises at least the predetermined number of matches between the streaming textual data and the windowed alert condition within the predetermined time window, determining that the windowed alert condition is satisfied.

10. The non-transitory computer readable storage medium of claim 9, wherein the determining whether the persistent alert data store comprises at least the predetermined number of matches between the streaming textual data and the windowed alert condition within the predetermined time window is performed periodically for the predetermined time window.

11. The non-transitory computer readable storage medium of claim 9, wherein the determining that the windowed alert condition is satisfied is performed upon determining that the predetermined number of matches within the predetermined time window is satisfied.

12. The non-transitory computer readable storage medium of claim 9, wherein the indication of the match comprises a time stamp.

13. The non-transitory computer readable storage medium of claim 8, the method further comprising:

responsive to generating the notification of the alert, storing a record of the notification at the persistent data store.

14. A computer system comprising:

a data storage unit; and a processor coupled with the data storage unit, wherein the processor when executed:

receives streaming textual data; generate a plurality of copies of the streaming textual data;

transmits a first copy of the streaming textual data to an ingestion service for persistent storage at a data plane;

transmits a second copy of the streaming textual data to an alert evaluation service for performing alert evaluation on the streaming textual data, wherein the ingestion service is performed on the first copy of the streaming textual data and the alert evaluation service is performed on the second copy of the streaming textual data independently and concurrently; store the first copy of the streaming textual data at a persistent data store of the data plane;

evaluates the second copy of the streaming textual data by the alert evaluation service to detect an alert by comparing streaming textual data to alert conditions and detecting the alert responsive to satisfying the alert conditions, wherein the alert conditions comprise a single instance alert condition for detecting the alert in response to identifying a single match between the streaming textual data and the single instance alert condition, and a windowed alert condition for detecting the alert in response to identifying a predetermined number of matches between the streaming textual data and the windowed alert condition with a predetermined time window; and generates a notification of the alert responsive to detecting an alert at the alert evaluation service.

* * * * *